May 15, 1928.  1,670,085
J. VELLANTI
ILLUMINATED LICENSE PLATE HOLDER
Filed June 2, 1924
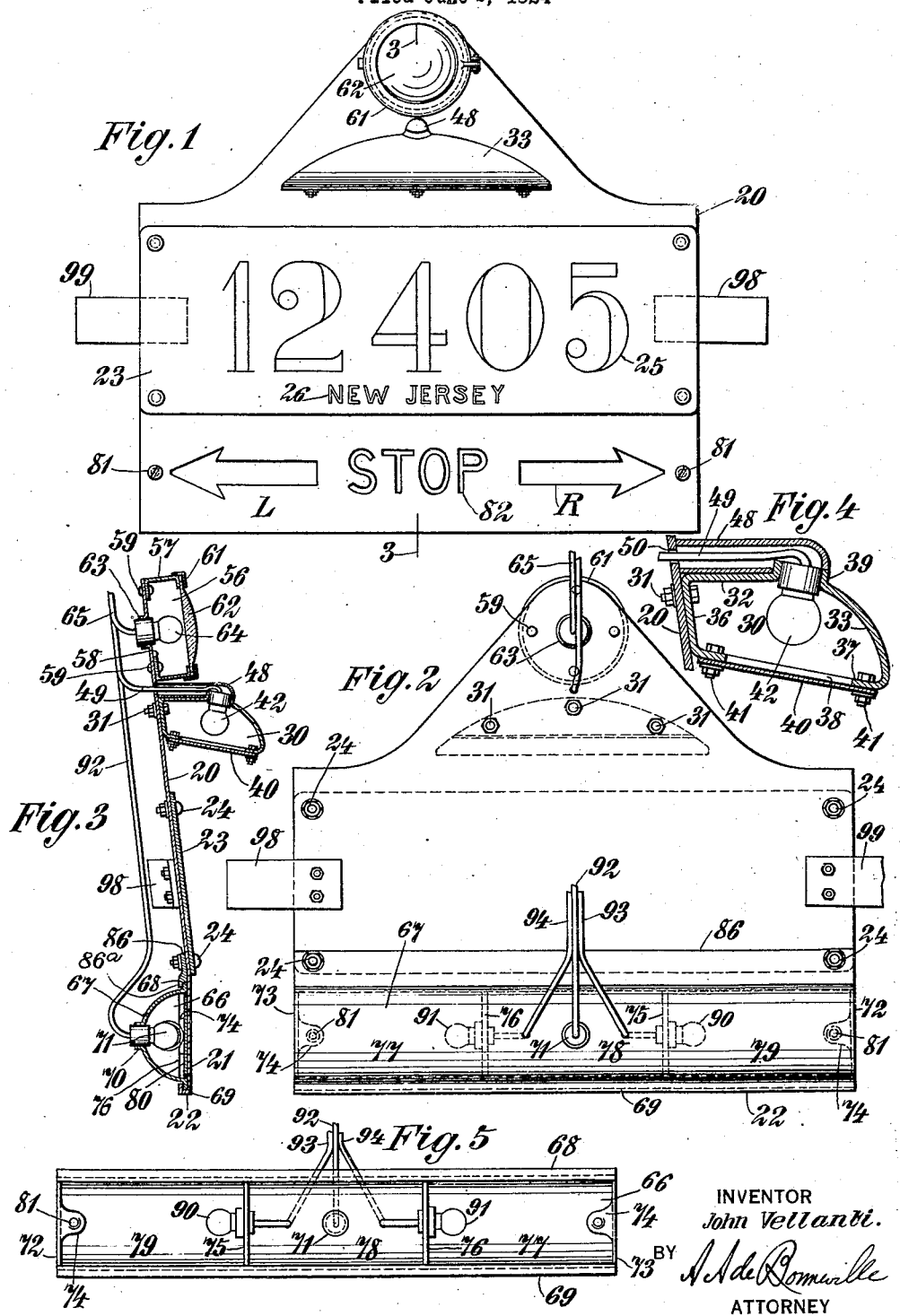
INVENTOR
John Vellanti.
BY
ATTORNEY Patented May 15, 1928.

1,670,085

UNITED STATES PATENT OFFICE.

JOHN VELLANTI, OF WEST NEW YORK, NEW JERSEY.

ILLUMINATED-LICENSE-PLATE HOLDER.

Application filed June 2, 1924. Serial No. 717,256.

This invention relates to an illuminated license plate holder.

The holder is specially adapted to vehicles, like automobiles, although it may be used for other purposes.

The object of the invention is the production of a license plate holder, wherein the light rays from a source of light can be directly reflected on the face of the license plate thereof. The second object of the invention is the production of a license plate holder of low first cost, and which the usual license plate can be detachably connected, without in any way making any changes or alterations in the construction thereof. The third object is the production of a license plate holder with a tail light, of the usual construction, a light chamber with a source of light to illuminate the license plate of the holder, and which has connected thereto a plurality of other light chambers with sources of light that are reflected through openings in the holder.

In the accompanying drawings Fig. 1 represents a front view of a license plate holder with the invention incorporated therein; Fig. 2 shows a rear view of Fig. 1; Fig. 3 indicates a section of Fig. 1 on the line 3, 3; Fig. 4 is an enlarged fragmentary portion of Fig. 3 and Fig. 5 shows a front view of some details.

The illuminated license plate holder comprises a supporting plate with the inclined upper portion 20 and the vertical lower portion 21. The lower edge of the portion 21 has formed therewith the return flange 22.

To the front side of the portion 20 is detachably secured the license plate 23, by means of the bolts 24. The plate 23 has indicated thereon the usual numerals 25, and any other indications as the name of the State to which the license refers, as indicated at 26.

A light chamber 30 is fastened to the outer face of the portion 20 of the supporting plate, by means of the bolts 31. The said light chamber comprises the top wall 32, which joins with the curved front wall 33. The wall 33 is curved in planes at right angles to the plane of the license plate 23, and both the walls 32 and 33 are crescent in shape in planes parallel to said license plate, to concentrate the reflecting light rays from the electric light bulb 42 to be described on the said plate. The rear wall of the chamber is shown at 36, and the bottom wall is shown at 37. The latter has formed therein the opening 38, and the top wall 32 has formed therein the sleeve 39. To the wall 37 under the opening 38, is detachably fastened the transparent or semi-transparent plate 40, by means of the bolts 41. The plate 40 may be of clear glass, smoked glass, celluloid or other suitable material. In the sleeve 39 is supported the socket of an electric light bulb 42. The longitudinal axis of the electric light bulb 42 is inclined to the plane of the license plate 23, so that beams of light from said bulb directly impinge on said plate. A conduit 48 extends from the sleeve 39 to the supporting plate. A cable 49 with a pair of wires for the electric current extends from the socket of the electric bulb 42 and runs through the conduit 48 and through an opening 50 in the portion 20 of the supporting plate.

The inner face of the roof 32 and front wall 33 of the light chamber 30 are polished or have attached thereto a looking glass not shown, to constitute a reflector for the electric light bulb 42.

Light rays from the electric light bulb 42 are directly transmitted through the plate 40 to license plate 23. Light rays from said bulb also impinge against the roof 32 and front wall 33, and are thence reflected through the plate 40 to the license plate 23.

A tail light 56 comprises the cylindrical casing 57, from which extends the rear annular flange 58. The said flange is fastened to the portion 20 in this instance by means of the rivets 59 above the light chamber 30. A front cover 61 with the lens 62 is hinged to the casing of the tail light. The portion 20 of the supporting plate to which the rear flanges 58 are fastened, has formed therein the sleeve 63, which support the socket of the electric light bulb 64. A cable 65 for wires for electric current extends from the socket of the electric light bulb 64.

A lower light casing is indicated in its entirety by the numeral 66 and is located to bear on the rear face of the portion 21 of the supporting plate. It comprises the semi-cylindrical rear wall 67, which has extending from its top and bottom edges the flanges 68 and 69. The wall 67 has formed therein the sleeve 70, for the electric light bulb 71. The end walls of said casing are shown at 72 and 73, and from which extend at right angles thereto and integral therewith the lugs 74. The vertical cross walls 75 and 76 parallel to the end walls 72 and 73, divide the casing into the three light chambers 77, 78 and 79.

A transparent or semitransparent plate 80 bears on the outer edges of the walls 72, 73, 75 and 76 and on the lugs 74 and is perpendicular to the longitudinal axis of the electric light bulb 71. The plate may be of clear glass, smoked glass, celluloid or of other suitable material. The plate 80 is detachably secured in position by means of the screws 81, which engage the lugs 74. The plate 80 has formed therein openings for the word Stop indicated at 82 and openings for the arrows indicated at R and L. A locking clamp 86 having the nose end 86$^a$ is detachably fastened to the rear face of the portion 20 of the supporting plate, by means of the bolts 24 already described. The flanges 68 and 69 respectively engage the return flange 22 of the portion 21 of the supporting plate and the nose end 86$^a$ of the locking clamp 86.

The electric light bulb 71 extends into the light chamber 78. In the cross walls 75 and 76 are mounted respectively the sockets of the electric light bulbs 90 and 91. The electric light bulb 90 projects into the light chamber 79 and the electric light bulb 91 projects into the light chamber 77. Coils 92, 93 and 94 for wire for electric current extend respectively from the sockets of the electric light bulbs 71, 90 and 91.

Brackets 98 and 99 extend from portion 20 of the supporting plate and by means of which said plate may be fastened to a vehicle.

When the electric light bulb 64 is energized the tail light is lit. When the electric light bulb 42 is energized the license plate 23 is illuminated. The electric light bulb 91 when energized illuminates the arrow R, and the electric light bulb 90 when energized illuminates the arrow L. When the electric light bulb 71 is energized, the word Stop is illuminated.

Various modifications may be made in the invention and the present exemplification is to be taken as illustrative and not limitative thereof.

Having described my invention what I desire to secure by Letters Patent and claim is:—

In a license plate holder the combination of a supporting plate having an upper inclined portion, a license plate detachably connected to said upper portion, a light chamber connected to and extending from said upper portion and inclined thereto, said light chamber comprising a top wall, a curved front wall joining with said top wall, said front wall curved in planes at right angles to the plane of the license plate, and both the front wall and top wall being crescent in shape in planes parallel to said license plate to concentrate reflecting light rays, a sleeve formed in said top wall, a conduit extending from the sleeve formed with the top wall, a bottom wall having an opening formed for the light chamber, a transparent plate connected to the bottom wall over the opening therein, an electric light bulb having its socket supported in the sleeve of the top wall and a cable comprising a pair of wires extending through said sleeve and conduit for the socket of said electric light bulb.

Signed at the borough of Manhattan, city of New York, in the county of New York and State of New York, this 20th day of May, A. D. 1924.

JOHN VELLANTI.